P. E. AND S. M. TABER.
R. TABER, ADMINISTRATRIX OF S. M. TABER, DEC'D.
TIRE DRESSING WHEEL.
APPLICATION FILED APR. 13, 1920.
1,395,309.
Patented Nov. 1, 1921.
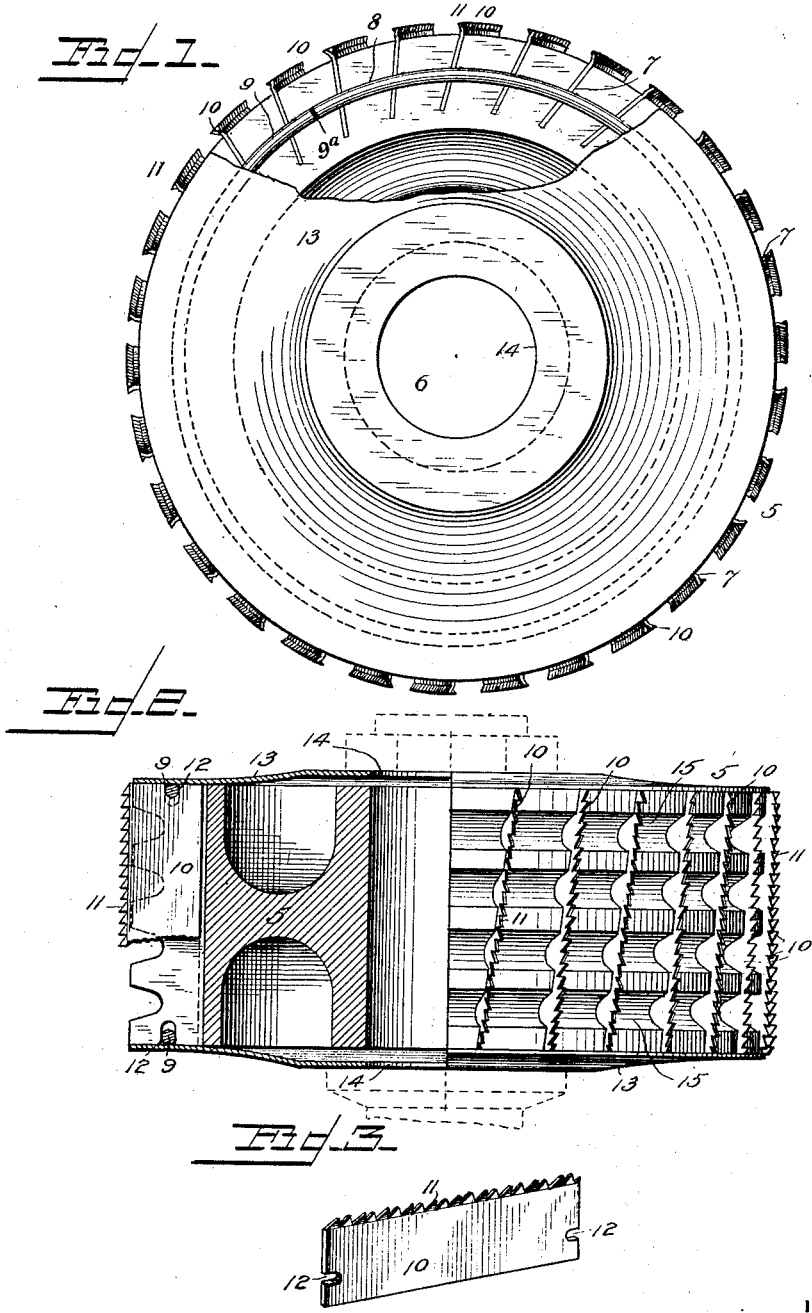
WITNESSES
INVENTORS.
Samuel M. Taber & Percy E. Taber,
BY
ATTORNEY

UNITED STATES PATENT OFFICE.

PERCY EDWARD TABER AND SAMUEL MAURICE TABER, OF BERKELEY, CALIFORNIA; ROSE TABER ADMINISTRATRIX OF SAID SAMUEL M. TABER, DECEASED.

TIRE-DRESSING WHEEL.

1,395,309.     Specification of Letters Patent.     Patented Nov. 1, 1921.

Application filed April 13, 1920. Serial No. 373,494.

*To all whom it may concern:*

Be it known that we, PERCY E. TABER and SAMUEL M. TABER, citizens of the United States, residing at Berkeley, in the county of Alameda and State of California, have invented a new and useful Tire-Dressing Wheel, of which the following is a specification.

This invention relates to implements for dressing vehicle tires.

In the removal of surplus rubber from tires, which is generally necessary in making repairs prior to vulcanizing, or to allow a new tread to be fitted snugly around an old case, an emery wheel, rasp or knife is commonly employed. All three are unsatisfactory. Work with an emery wheel is too slow and leaves too smooth a surface, it being highly desirable that a fine ribbed surface be raised on the tire for vulcanizing. The rasp is too rough and severe and in a short time gets too dull for use; and while it may be resharpened, it is only practicable to do this once. A knife is manipulated by hand, and since it cuts only large slices, the tire must be finished with an emery wheel or rasp.

It is the object of this invention to provide an implement which will remove all the surplus rubber at any point on the tire, doing all the work that the best types of emery wheels, rasps or rubber knives can do, and which will leave a perfect vulcanizing surface, something that no emery, rasp or knife will do.

Other objects are to provide a tire dressing tool which will lack the expensive replacement parts of such machines as the rotary rasp, which will hold the cutting elements firmly and yet permit ready removal of any of them, which will not allow heating of its parts, and which will not require any special skill to use to advantage.

The present application is a continuation in part of the application filed Sept. 11, 1919, Serial No. 323,201.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Figure 1 is a side view of a tire dressing wheel constructed in accordance with our invention, a part being broken away.

Fig. 2 is a vertical quarter section of the same.

Fig. 3 is a perspective view of one of the cutting elements.

The numeral 5 designates the body of a wheel, preferably of cast aluminum but satisfactory if constructed of other metal, hard wood, etc. This wheel has an axial bore 6 permitting it to be mounted on a shaft. A plurality of narrow slots 7 run transversely of the periphery of the wheel at an angle to the side faces thereof. These slots may be about thirty in number for a 5 x 2 inch wheel and should not have a thickness much exceeding inch. An annular groove 8 is provided on the side faces of the wheel, perhaps $\frac{5}{16}$ of an inch from the periphery of a wheel of the size stated. Retaining rings 9, seated in the grooves 8, stand out a little from the side faces of the wheel when so seated. The rings 9 are split at one point 9ª so as to be easily removed. It will be understood that the grooves intersect or cut into each of the transverse slots.

Saw toothed blades 10 are fitted into the slots. These blades have the same length as the slots and have a width greater than the depth of the slots only by the depth of their teeth 11. When the blades are slipped into their slots, therefore, the teeth 11 are the only parts which project from the wheel. Each blade has slots 12 at either end which when the blades are in position form a continuation of the grooves 8 which cut the slots as stated. Thus the retaining rings when placed engage all the blades on both sides of the wheel and hold them securely. Peripheral grooves 15 are provided on the wheel, which grooves intersect the slots, and expose portions of each blade as shown in Fig. 2. The depth of grooves 15 is about the distance of rings 9 from the periphery of the wheel. These peripheral grooves allow free radiation of heat and prevent the wheel and blades from overheating.

A dished plate 13 of the same appropriate diameter as the wheel and having a central hole or bore 14 of the same size and for the same purpose as bore 6, is provided on each side of the wheel for holding the rings 9 in position. The plates 13 are preferably of strong resilient metal and have their dished faces toward the wheel being pressed against the latter by any well known means mounted upon the shaft (indicated in dotted lines in Fig. 2) which drives the wheel. The effect of the pressure on these plates is to push the plates against the retaining rings and hold the latter securely, while the rings in turn lock the blades. The peripheral edges of the plates press against the wheel faces and serve as additional means to prevent endwise movement of the blades. The dished plates when fully pressed against the wheel or blade carrier lie preferably flat so that they touch the hub of the carrier. This provides the necessary friction for driving the wheel.

The slots which receive the blades are inclined not merely with respect to the side faces or transversely of the wheel, but are cut so as to be inclined or divergent with respect to radii of the wheel. By arranging the blades at an angle, the blades will wear longer as the teeth are given a shearing effect, and the contact with the material is different. However, the teeth may be arranged radially and we desire our claims to cover the radial arrangement as well as the angular disposition shown.

A close examination of the drawing will disclose what is believed to be one of the important features of this tire dressing tool. The teeth of each alternate blade point in the same direction, or in other words, the teeth of each blade point in the opposite direction from those of the two neighboring blades. The blades may have 10 to 24 teeth per inch, according to the size of the wheel and the character of the work to be done. The blades resemble a hack saw blade but with this difference, viz: this blade has every tooth set, while a hack saw blade has every third tooth straight. The preferable material for the blades is tool steel, but high speed or other steel can be used.

The above described dressing wheel will remove surplus rubber from any part of the tire, leaving a fine ribbed or ridged surface, which forms a perfect vulcanizing surface for all retread, patching, sectional, inlay or half sole work. The cement grips these ridges and forms a perfect union with the rubber parts. The teeth will not grab the fabric nor tear the cords in a cord tire, but on the other hand raise a soft, downy nap which is particularly favorable for the perfect cohesion of the cement and new rubber.

While the invention is designed especially for work with rubber, it has been found adaptable to woodworking and could be used in work on leather, fiber and other materials.

While the invention has been described in considerable detail, it will be understood that recourse may be had to many departures from the present disclosure. The materials, the dimensions of parts, as well as the uses of the machine, may be changed and modified. It may be found expedient to use teeth of varying shapes and sizes and to have two blades with teeth pointing one way. Other arrangements of the blades, too numerous to describe separately, may be availed of. We desire the broadest possible protection for our invention and consider ourselves limited only by the following claims.

What is claimed is:—

1. The combination with a wheel having transverse slots spaced apart, each slot being separated by a solid portion of the wheel, of toothed blades mounted in the slots, and means for holding the blades in place, said blades having every tooth set and all of said teeth being of the same size.

2. The combination with a wheel having blade retaining means, of saw-toothed blades secured to the wheel so that the teeth project outwardly from the periphery of the wheel, said blades lying in non-radial planes and intersecting the faces of the wheel at an angle.

3. The combination with a wheel having blade holding means, of saw toothed blades removably secured to the wheel and lying in non-radial planes.

4. The combination with a wheel having blade holding means, of a plurality of toothed blades held by the wheel, the teeth of some of the blades pointing in a direction opposite to that of the teeth of the remaining blades.

5. The combination with a wheel having blade holding means, of a plurality of saw toothed blades secured to the wheel, the teeth of any two adjacent blades pointing in opposite directions.

6. The combination with a wheel having spaced transverse slots sunk in its peripheral face, of saw toothed blades removably fitted into said slots, means for holding the plates from radial movement, and means for holding the blades from endwise movement.

7. The combination with a wheel having spaced transverse slots sunk in its peripheral face, an annular groove on each side face, of blades fitted into said slots, and means fitted in said grooves for locking the blades.

8. The combination with a wheel having transverse slots, and annular grooves on its sides intersecting said slots, of blades fitted into said slots and having end slots, and means held in said grooves and end slots for locking the blades.

9. The combination with a wheel having transverse slots, an annular groove on its side walls intersecting said slots, of blades fitted into the slots, locking means held in said grooves, and means formed on the blades for engaging with the said locking means.

10. The combination with a wheel having transverse slots, and annular grooves on its sides intersecting the slots, of blades fitted into the slots of the wheel and having slots at their ends, and means held in said grooves and engaging with the blades by means of the blade slots.

11. The combination with a wheel having transverse slots, and annular grooves on its sides intersecting said slots, of blades fitted snugly into the slots and having end slots conforming to the grooves and forming a continuation thereof, and rings held in the grooves and engaging with the slots of the blades to lock the same against movement in any direction.

12. The combination with a wheel having blade receiving slots, and grooves on the side faces intersecting said slots, of blades fitted in the slots and having their ends cut away where they meet said grooves, means in the grooves for engaging with the cut-away parts of the blades, and means for holding the first-named means in place.

13. The combination with a wheel having blade receiving slots, of annular grooves on the sides of the wheel, blades fitted in the slots, blade retaining rings seated in said grooves and engaging the blades, and means outside the wheel for holding the rings in place.

14. The combination with a wheel having blade receiving slots, of blades fitted in the slots, grooves in the side faces of the wheel, blade retainers seated in said grooves, and means outside the wheel for holding the retainers in place, said means additionally holding the blades in position.

15. The combination with a wheel having blade receiving slots, of blades fitted in the slots, grooves in the side faces of the wheel, blade locking means seated in the grooves, and dished plates coaxially mounted with the wheel with the dish thereof facing inwardly, said plates holding the locking means in place and bearing against the ends of the blades.

16. The combination with a wheel having blade receiving slots running transversely of the wheel, of blades fitted in the slots, peripheral grooves intersecting the slots, and means for holding blades in the transverse slots.

17. The combination with a wheel having blade receiving slots running transversely of the wheel, of blades fitted in the slots, a series of peripheral grooves intersecting the slots, and of less depth than the latter, and means for retaining the blades in place.

18. The combination with a wheel having blade receiving slots running transversely of the wheel, of blades fitted in the slots, a series of peripheral grooves intersecting the slots, annular grooves on the side faces of the wheel also intersecting the slots, the distance of the annular grooves from the periphery of the wheel being substantially equal to the depth of said peripheral grooves.

19. The combination with a wheel having a series of spaced blade-receiving slots, said slots extending transversely of the wheel and at an inclination or angle to the side faces of the wheel, the slots each lying in planes non-radial of the wheel, blades fitted in said slots, a series of spaced peripheral grooves intersecting each slot, and means provided on the side faces of the wheel for locking the blades in place.

20. The combination with a wheel having a series of spaced blade receiving slots, said slots extending transversely of the wheel and at an inclination to the side faces of the wheel, the slots each lying in planes non-radial with respect to the wheel, blades fitted into said slots, a series of spaced peripheral grooves intersecting each slot, annular grooves on the side faces of the wheel, and rings received within the annular grooves and engaging with the blades for locking the same in place.

21. The combination with a wheel having a series of spaced blade receiving slots, said slots extending transversely of the wheel and at an angle to the side faces of the wheel, the slots each lying in planes non-radial of the wheel, blades fitted into said slots, a series of spaced peripheral grooves intersecting each slot, blade locking means provided on the side faces of the wheel, and dished plates coaxially mounted with the wheel with the dish thereof facing inwardly, said plates holding the locking means in place and bearing against the ends of the blades.

22. The combination with a wheel having a series of spaced blade receiving slots, said slots extending transversely of the wheel and at an angle to the side faces of the wheel, the slots each lying in planes non-radial of the wheel, blades fitting into said slots, a series of spaced peripheral grooves intersecting each slot, an annular groove on each side face of the wheel and intersecting each slot at the corresponding end thereof, means fitting into the annular slots and engaging with the blades for locking the same in position, and dished plates coaxially mounted with the wheel, with the dish thereof facing inwardly, said plates holding the locking means in place and bearing against the ends of the blades.

In testimony that we claim the foregoing as our own, we have hereto affixed our signatures.

PERCY EDWARD TABER.
SAMUEL MAURICE TABER.